US012662756B2

(12) United States Patent (10) Patent No.: US 12,662,756 B2
Ohno et al. (45) Date of Patent: Jun. 23, 2026

(54) ULTRAVIOLET BLOCKING ACRYLIC FIBERS, ULTRAVIOLET BLOCKING FABRIC AND FIBER PRODUCT CONTAINING THE SAME, AND METHOD FOR MANUFACTURING THE SAME

(71) Applicant: KANEKA CORPORATION, Osaka (JP)

(72) Inventors: Shigeki Ohno, Osaka (JP); Keita Uchibori, Osaka (JP)

(73) Assignee: KANEKA CORPORATION, Osaka (JP)

( * ) Notice: Subject to any disclaimer, the term of this patent is extended or adjusted under 35 U.S.C. 154(b) by 319 days.

(21) Appl. No.: 18/228,410

(22) Filed: Jul. 31, 2023

(65) Prior Publication Data

US 2023/0374705 A1 Nov. 23, 2023

Related U.S. Application Data

(63) Continuation of application No. PCT/JP2022/004883, filed on Feb. 8, 2022.

(30) Foreign Application Priority Data

| Feb. 19, 2021 | (JP) | ................................. 2021-025561 |
| Feb. 19, 2021 | (JP) | ................................. 2021-025562 |

(51) Int. Cl.
| *D01F 6/40* | (2006.01) |
| *C08F 220/46* | (2006.01) |
| *C08K 3/22* | (2006.01) |
| *C08K 5/42* | (2006.01) |
| *C08K 13/02* | (2006.01) |
| *D01D 5/06* | (2006.01) |
| *D01F 1/10* | (2006.01) |
| *D04B 1/16* | (2006.01) |

(52) U.S. Cl.
CPC .............. *D01F 6/40* (2013.01); *C08F 220/46* (2013.01); *C08K 5/42* (2013.01); *C08K 13/02* (2013.01); *D01D 5/06* (2013.01); *D01F 1/106* (2013.01); *D04B 1/16* (2013.01); *C08F 2800/20* (2013.01); *C08K 2003/2241* (2013.01); *C08K 3/2279* (2013.01); *C08K 2201/014* (2013.01); *D10B 2321/101* (2013.01); *D10B 2401/22* (2013.01)

(58) Field of Classification Search
USPC .................... 428/105, 221; 442/62, 131, 374
See application file for complete search history.

(56) References Cited

U.S. PATENT DOCUMENTS

| 4,457,969 | A | * | 7/1984 | Biale | ........................ D04H 1/64 |
| | | | | | 428/920 |
| 4,513,126 | A | | 4/1985 | Yamazaki et al. |
| 6,048,955 | A | * | 4/2000 | Wade | .................... C08F 214/10 |
| | | | | | 526/287 |
| 8,932,704 | B2 | * | 1/2015 | Porbeni | ................... A61L 27/18 |
| | | | | | 428/221 |
| 2018/0119312 | A1 | | 5/2018 | Yoshimura et al. |
| 2021/0140071 | A1 | | 5/2021 | Yoshimura et al. |

FOREIGN PATENT DOCUMENTS

| JP | H01-25324 B2 | 5/1989 |
| JP | H6-207311 A | 7/1994 |
| JP | 2002-363226 A | 12/2002 |
| JP | 2018-53378 A | 4/2018 |
| WO | 2017002771 A1 | 1/2017 |
| WO | 2021039528 A1 | 3/2021 |

OTHER PUBLICATIONS

International Search Report issued in corresponding International Application No. PCT/JP2022/004883 mailed Mar. 29, 2022 (5 pages).
Written Opinion issued in corresponding International Application No. PCT/JP2022/004883 mailed Mar. 29, 2022 (4 pages).

* cited by examiner

*Primary Examiner* — Maria V Ewald
(74) *Attorney, Agent, or Firm* — Osha Bergman Watanabe & Burton LLP

(57) ABSTRACT

Ultraviolet blocking modacrylic fibers contain an anionic surfactant in an amount of 0.03 wt % or more. The ultraviolet protection factor (UPF) rating value of the ultraviolet blocking modacrylic fibers measured according to JIS L 1925: 2019 is UPF15 or more. Thus, ultraviolet blocking modacrylic fibers that are less likely to be discolored and have excellent ultraviolet blocking properties, an ultraviolet blocking fabric and a fiber product containing the ultraviolet blocking modacrylic fibers, and a method for manufacturing the ultraviolet blocking modacrylic fibers are provided.

16 Claims, No Drawings

ULTRAVIOLET BLOCKING ACRYLIC FIBERS, ULTRAVIOLET BLOCKING FABRIC AND FIBER PRODUCT CONTAINING THE SAME, AND METHOD FOR MANUFACTURING THE SAME

TECHNICAL FIELD

One or more embodiments of the present invention relate to ultraviolet blocking modacrylic fibers, an ultraviolet blocking fabric and a fiber product containing the same, and a method for manufacturing ultraviolet blocking modacrylic fibers.

BACKGROUND

In recent years, fibers and fabrics that block ultraviolet rays have been developed to reduce the adverse effects of ultraviolet rays on human bodies. For example, in Patent Document 1, modacrylic fibers containing an ultraviolet absorber having a specific structure are developed. The ultraviolet absorber is a copolymer of a benzophenone-based ultraviolet-absorbing monomer (a) and a benzotriazole-based ultraviolet-absorbing monomer (b), which are radically polymerizable ultraviolet absorbers, and a copolymerizable vinyl monomer (c). A modacrylic copolymer and the ultraviolet absorber, which are constituent components of the modacrylic fibers, are mixed and the resultant mixture is spun into yarns. This allows the fibers to contain a desired amount of the ultraviolet absorber, resulting in modacrylic fibers with excellent light resistance.

PATENT DOCUMENTS

Patent Document 1: JP 2002-363226A

However, in Patent Document 1, the light resistance of the modacrylic fibers containing the ultraviolet absorber is evaluated based on discoloration and single-fiber strength of the fibers before and after the fibers are irradiated with ultraviolet rays for 50 hours, and the ultraviolet blocking properties of a fabric made of the modacrylic fibers are not examined.

SUMMARY

One or more embodiments of the present invention provide ultraviolet blocking modacrylic fibers that are less likely to be discolored and have excellent ultraviolet blocking properties, an ultraviolet blocking fabric and a fiber product made of the ultraviolet blocking modacrylic fibers, and a method for manufacturing the ultraviolet blocking modacrylic fibers.

One or more embodiments of the present invention relate to ultraviolet blocking modacrylic fibers containing an anionic surfactant in an amount of 0.03 wt % or more, wherein an ultraviolet protection factor (UPF) rating value of the ultraviolet blocking modacrylic fibers measured according to JIS L 1925: 2019 is UPF15 or more.

One or more embodiments of the present invention relate to an ultraviolet blocking fabric containing the above-mentioned ultraviolet blocking modacrylic fibers in an amount of 40 wt % or more.

One or more embodiments of the present invention relate to a fiber product containing the above-mentioned ultraviolet blocking fabric.

One or more embodiments of the present invention relate to a method for manufacturing the above-mentioned ultraviolet blocking modacrylic fibers, including a step of forming a modacrylic polymer through emulsion polymerization, wherein an emulsifier used in the emulsion polymerization includes an anionic surfactant.

With one or more embodiments of the present invention, it is possible to provide ultraviolet blocking modacrylic fibers that are less likely to be discolored and have excellent ultraviolet blocking properties, and an ultraviolet blocking fabric and a fiber product made of the ultraviolet blocking modacrylic fibers.

With the manufacturing method of one or more embodiments of the present invention, it is possible to obtain ultraviolet blocking modacrylic fibers that are less likely to be discolored and have excellent ultraviolet blocking properties.

DETAILED DESCRIPTION

The inventors of one or more embodiments of the present invention conducted numerous studies in order to suppress discoloration of modacrylic fibers and fabrics containing the modacrylic fibers while providing ultraviolet blocking properties thereto. As a result, they surprisingly found that it is possible to provide ultraviolet blocking properties to modacrylic fibers while suppressing discoloration thereof by adding an anionic surfactant to the modacrylic fibers and controlling the amount of the anionic surfactant, and thus reached one or more embodiments of the present invention.

The reason why the ultraviolet blocking properties are exhibited is a matter of speculation, but is considered as follows. The anionic surfactant, which is also used as an emulsifier when a modacrylic polymer that is a constituent component of the modacrylic fibers is formed by an emulsion polymerization method, has ultraviolet absorbing ability. The anionic surfactant remains in the modacrylic polymer obtained through the emulsion polymerization, and also remains in the modacrylic fibers containing the modacrylic polymer. It is thus inferred that the modacrylic fibers exhibit high ultraviolet blocking properties through control of the amount of the anionic surfactant in the modacrylic fibers. Due to the anionic surfactant being contained in the modacrylic fibers, it is possible to shield, from ultraviolet rays an area located at a position apart from a face opposite to the face on an ultraviolet ray irradiation side, to suppress discoloration caused by ultraviolet rays to ensure high flame retardancy as in conventional modacrylic fibers, and to use the modacrylic fibers to develop a wide variety of fiber products from the viewpoint of safety. Also, providing ultraviolet blocking properties using an anionic surfactant makes it possible to maintain favorable feel and touch of modacrylic fibers.

Note that the anionic surfactant may be kneaded into the modacrylic fibers in the spinning process or attached to the modacrylic fibers after the spinning process, but it is preferable to use a modacrylic polymer containing the anionic surfactant from the viewpoint of further improving ultraviolet blocking properties. It is inferred that the anionic surfactant used in the emulsion polymerization step remains in the modacrylic polymer and exhibits high ultraviolet blocking properties in the modacrylic fibers formed using this modacrylic polymer containing the anionic surfactant.

Anionic Surfactant

There is no limitation on the type of anionic surfactant according to one or more embodiments of the present invention as long as the anionic surfactant can be used when a modacrylic polymer is formed by an emulsion polymerization method, but a sulfuric acid ester-type anionic surfactant or a sulfonic acid-type anionic surfactant is preferable. Particularly preferable sulfuric acid ester-type anionic surfactants include monoalkyl sulfate salts, alkyl polyoxyethylene sulfate salts, and the like, and particularly preferable sulfonic acid-type anionic surfactants include alkyl benzenesulfonate salts, alkyl polyphenylene ether sulfonate salts, and the like. Examples of the salts include a potassium salt, a sodium salt, and an ammonium salt. The anionic surfactants may be used alone or in combination of two or more. The number of carbon atoms in an alkyl group in the anionic surfactant is not particularly limited, but may be, for example, 4 or more and 23 or less, 6 or more and 24 or less, 8 or more and 22 or less, or 10 or more and 20 or less. It is preferable that the anionic surfactant contains at least an alkyl benzenesulfonate salt, and it is more preferable that the anionic surfactant contains a monoalkyl sulfate salt and an alkyl benzenesulfonate salt. The number of carbon atoms in an alkyl group in the monoalkyl sulfate salt is not particularly limited, but may be, for example, 4 or more and 23 or less, 6 or more and 24 or less, 8 or more and 22 or less, or 10 or more and 20 or less. The number of carbon atoms in an alkyl group in the alkyl benzenesulfonate salt is not particularly limited, but may be, for example, 4 or more and 23 or less, 6 or more and 24 or less, 8 or more and 22 or less, or 10 or more and 20 or less. Specific examples of the anionic surfactant include sodium lauryl sulfate, sodium dodecyl sulfate, sodium polyoxyethylene lauryl ether sulfate, and sodium benzeneoxy bis-tetrapropylene sulfonate, and one or two or more of these anionic surfactants may be a used. In particular, it is preferable to use sodium lauryl sulfate and sodium benzeneoxy bis-tetrapropylene sulfonate together.

Modacrylic Polymer

The modacrylic polymer may be a copolymer containing acrylonitrile in an amount of 35 wt % or more and 85 wt % or less, a halogen-containing monomer in an amount of 15 wt % or more and 65 wt % or less, and other components (preferably sulfonic acid group-containing vinyl monomer) in an amount of 0 wt % or more and 3 wt % or less. The modacrylic polymer may be a copolymer containing acrylonitrile in an amount of 40 wt % or more and 70 wt % or less, a halogen-containing monomer in an amount of 30 wt % or more and 60 wt % or less, and other components (preferably sulfonic acid group-containing vinyl monomer) in an amount of 0 wt % or more and 3 wt % or less. When the contents of the acrylonitrile and the halogen-containing monomer in the modacrylic polymer are within the ranges above, the modacrylic fibers have favorable heat resistance and flame retardancy. There is no particular limitation on the other components as long as they are copolymerizable with acrylonitrile.

Examples of the halogen-containing monomer include a halogen-containing vinyl monomer and a halogen-containing vinylidene monomer. Examples of the halogen-containing vinyl monomer include vinyl chloride and vinyl bromide, and examples of the halogen-containing vinylidene monomer include vinylidene chloride and vinylidene bromide. These halogen-containing monomers may be a used alone or in combination of two or more.

Examples of the sulfonic acid group-containing vinyl monomer include methacrylic sulfonic acid, allyl sulfonic acid, styrenesulfonic acid, 2-acrylamide-2-methylpropane sulfonic acid, and salts thereof. Examples of the salts above include a sodium salt, a potassium salt, and an ammonium salt, but there is no limitation thereto. An example of the sodium salt is sodium p-styrenesulfonate. These sulfonic acid group-containing vinyl monomers may be used alone or in combination of two or more. The sulfonic acid group-containing vinyl monomer is used as needed, but when the content of the sulfonic acid group-containing vinyl monomer in the modacrylic polymer is 3 wt % or less, the production stability in the spinning process is excellent.

Although a commonly known polymerization method can be used to produce the modacrylic polymer, it is preferable to produce the modacrylic polymer through emulsion polymerization using the anionic surfactant as an emulsifier. Due to the anionic surfactant used in the emulsion polymerization method remaining in the modacrylic fibers, the anionic surfactant need not be added in the spinning process or a downstream process performed after spinning.

Ultraviolet Blocking Modacrylic Fibers

In one or more embodiments of the present invention, ultraviolet blocking modacrylic fibers contain the modacrylic polymer and the anionic surfactant described above, and have ultraviolet blocking properties.

The ultraviolet blocking modacrylic fibers contain the anionic surfactant in an amount of 0.03 wt % or more. This makes it possible to achieve favorable ultraviolet blocking properties and suppress discoloration caused by ultraviolet irradiation. From the viewpoint of further improving the ultraviolet blocking properties, more effectively suppressing discoloration of the fibers, and further improving the feel, the content of the anionic surfactant in the ultraviolet blocking modacrylic fibers may be 0.030 wt % or more and less than 0.150 wt %, 0.040 wt % or more and 0.140 wt % or less, or 0.040 wt % or more and less than 0.130 wt %, with respect to the overall weight of the modacrylic fibers. In the case of using a monoalkyl sulfate salt and an alkyl benzenesulfonate salt together as the anionic surfactant, the ultraviolet blocking modacrylic fibers may contain the monoalkyl sulfate salt in an amount of 0.010 wt % or more and less than 0.142 wt % and the alkyl benzenesulfonate salt in an amount of 0.008 wt % or more and less than 0.140 wt % or the ultraviolet blocking modacrylic fibers may contain the monoalkyl sulfate salt in an amount of 0.011 wt % or more and less than 0.141 wt %, and the alkyl benzenesulfonate salt in an amount of 0.009 wt % or more and less than 0.139 wt %. In the case of using sodium lauryl sulfate and sodium benzeneoxy bis-tetrapropylene sulfonate together as the anionic surfactant, the ultraviolet blocking modacrylic fibers may contain the sodium lauryl sulfate in an amount of 0.010 wt % or more and less than 0.142 wt %, and the sodium benzeneoxy bis-tetrapropylene sulfonate in an amount of 0.008 wt % or more and less than 0.140 wt %, or the ultraviolet blocking modacrylic fibers may contain the sodium lauryl sulfate in an amount of 0.011 wt % or more and less than 0.141 wt %, and the sodium benzeneoxy bis-tetrapropylene sulfonate in an amount of 0.009 wt % or more and less than 0.139 wt %.

The ultraviolet blocking modacrylic fibers may contain an ultraviolet reflector and/or an ultraviolet absorber as needed, but when the content of the anionic surfactant is less than 0.15 wt %, it is preferable that the ultraviolet blocking modacrylic fibers do not contain an ultraviolet reflector and/or an ultraviolet absorber. Meanwhile, when the content of the anionic surfactant is 0.15 wt % or more, it is preferable that the ultraviolet blocking modacrylic fibers contain an ultraviolet reflector and/or an ultraviolet absorber in addition to the anionic surfactant from the viewpoint of further improving the ultraviolet blocking properties, more effectively suppressing discoloration of the fibers, and further improving the feel of the fibers.

The content of the ultraviolet reflector in the ultraviolet blocking modacrylic fibers may be 0.5 wt % or more, 1.0 wt % or more, or 1.5 wt % or more, from the viewpoint of the ultraviolet blocking properties. The content of the ultraviolet reflector may be 4 wt % or less, 3.5 wt % or less, or 3 wt % or less, from the viewpoint of the feel and the suppression of discoloration of the fibers.

The content of the ultraviolet absorber in the ultraviolet blocking modacrylic fibers may be 0.05 wt % or more, 0.1 wt % or more, or 0.2 wt % or more, from the viewpoint of the ultraviolet blocking properties. The content of the ultraviolet absorber may be 2 wt % or less, 1.5 wt % or less, or 1 wt % or less, from the viewpoint of the feel and the suppression of discoloration of the fibers.

Although there is no particular limitation on the ultraviolet reflector, examples thereof include titanium oxide, zinc oxide, and aluminum oxide.

Although there is no particular limitation on the ultraviolet absorber, examples thereof include benzophenone-based ultraviolet absorbers, triazine-based ultraviolet absorbers, benzotriazole-based ultraviolet absorbers, salicylic acid-based ultraviolet absorbers, and cyanoacrylate-based ultraviolet absorbers. Specifically, examples of the benzophenone-based ultraviolet absorbers include 2-hydroxy-4-methoxy-benzophenone and 2-hydroxy-4-n-octyl-benzophenone. Examples of the triazine-based ultraviolet absorbers include 2-[4-[2-hydroxy-3-tridecyloxypropyl]oxy]-2-hydroxyphenyl]-4,6-bis(2,4-dimethylphenyl)-1,3,5-triazine and 2-[4-[2-hydroxy-3-didecyloxypropyl]oxy]-2-hydroxyphenyl]-4,6-bis(2,4-dimethylphenyl)-1,3,5-triazine. Examples of the benzotriazole-based ultraviolet absorbers include 2-(2'-hydroxy-5'-methylphenyl)benzotriazole, 2-(2'-hydroxy-5'-t-octylphenyl)benzotriazole, 2-(3'-t-butyl-2'-hydroxy-5'-methylphenyl)-5-chlorobenzotriazole, and 2-(2'-hydroxy-3',5'-di-t-amylphenyl)benzotriazole. Examples of the salicylic acid-based ultraviolet absorbers include phenyl salicylate, 2-ethylhexyl salicylate, p-t-butylphenyl salicylate, and p-octylphenyl salicylate. Examples of the cyano-acrylate-based ultraviolet absorbers include 2-ethylhexyl-2-cyano-3,3-diphenyl acrylate and ethyl-2-cyano-3,3-diphenyl acrylate.

The ultraviolet reflectors and the ultraviolet absorbers described above may be used alone or in combination of two or more. In the case of using the ultraviolet reflector and the ultraviolet absorber together, the total content of the ultraviolet reflector and the ultraviolet absorber in the ultraviolet blocking modacrylic fibers may be 4 wt % or less from the viewpoint of the feel and the suppression of discoloration of the ultraviolet blocking modacrylic fibers.

If the content of the anionic surfactant in the ultraviolet blocking modacrylic fibers is too high, the fibers tend to easily turn yellow when being irradiated with ultraviolet rays, and if the ratio of the anionic surfactant to the overall weight of the modacrylic fibers is 0.15 wt % or more, the feel tends to deteriorate. However, using the ultraviolet reflector and the ultraviolet absorber together in amounts within the range above makes it possible to suppress discoloration of the ultraviolet blocking modacrylic fibers and suppress deterioration of the feel. Even in the case where the ultraviolet blocking modacrylic fibers contain the ultraviolet reflector and/or the ultraviolet absorber, it is preferable that the ultraviolet blocking modacrylic fibers contain the anionic surfactant in an amount of less than 0.150 wt %, and it is more preferable that the ultraviolet blocking modacrylic fibers contain the anionic surfactant in an amount of 0.130 wt % or less, from the viewpoint of the feel and the suppression of discoloration of the ultraviolet blocking modacrylic fibers. In the case of using a monoalkyl sulfate salt and an alkyl benzenesulfonate salt together as the anionic surfactant, the ultraviolet blocking modacrylic fibers may contain the monoalkyl sulfate salt in an amount of 0.010 wt % or more and less than 0.142 wt % and the alkyl benzenesulfonate salt in an amount of 0.008 wt % or more and less than 0.140 wt %, or the ultraviolet blocking modacrylic fibers may contain the monoalkyl sulfate salt in an amount of 0.011 wt % or more and less than 0.141 wt % and the alkyl benzenesulfonate salt in an amount of 0.009 wt % or more and less than 0.139 wt %. In the case of using sodium lauryl sulfate and sodium benzeneoxy bis-tetrapropylene sulfonate together as the anionic surfactant, the ultraviolet blocking modacrylic fibers may contain the sodium lauryl sulfate in an amount of 0.011 wt % or more and less than 0.141 wt % and the sodium benzeneoxy bis-tetrapropylene sulfonate in an amount of 0.009 wt % or more and 0.139 wt % or less, or the ultraviolet blocking modacrylic fibers may contain the sodium lauryl sulfate in an amount of 0.012 wt % or more and 0.140 wt % or less, and the sodium benzeneoxy bis-tetrapropylene sulfonate in an amount of 0.010 wt % or more and 0.138 wt % or less.

The content of the anionic surfactant in the ultraviolet blocking modacrylic fibers can be measured in conformity with JIS K 0400-30-10:1999 "Determination of Anionic Surfactants by the Methylene Blue Spectrometric Method". A solution obtained by dissolving the modacrylic fibers in an organic solvent can be used as a measurement sample. For example, a solution obtained by gradually adding dimethylformamide (DMF) heated to 50° C. to a predetermined amount of the modacrylic fibers and dissolving the modacrylic fibers in the minimum amount of DMF necessary to dissolve the modacrylic fibers is used. In the case where two or more types of anionic surfactants are contained, both the total content of the anionic surfactants and the content of each anionic surfactant can be quantified in conformity with JIS K 0400-30-10: 1999 "Determination of Anionic Surfactants by the Methylene Blue Spectrometric Method".

Common quantification methods can be used to measure the contents of the ultraviolet reflector and the ultraviolet absorber in the ultraviolet blocking modacrylic fibers. For example, in the case of titanium dioxide, an aluminum reduction titration method can be used.

The ultraviolet blocking properties of the ultraviolet blocking modacrylic fibers can be evaluated by measuring the ultraviolet protection factor (UPF) conversion value, the UPF rating value, and the ultraviolet blocking rate according to JIS L 1925: 2019, but there is no particular limitation to this method. A fabric containing the modacrylic fibers such as a knitted fabric containing the modacrylic fibers in an amount of 100 wt % can be used to measure the UPF conversion value, the UPF rating value, and the ultraviolet blocking rate.

Specifically, the UPF conversion value is calculated using Expression (1) below.

$$\text{UPF conversion value} = \Sigma E(\lambda) \cdot S(\lambda) \cdot \Delta(\lambda) / \Sigma E(\lambda) \cdot S(\lambda) \cdot T(\lambda) \cdot \Delta(\lambda) \qquad \text{Expression 1}$$

UPF conversion value: ultraviolet protection factor conversion value $S(\lambda)$: relative energy value of solar spectral irradiance at wavelength $\lambda$ $E(\lambda)$: value expressing degree of influence on skin at each wavelength $\Delta(\lambda)$: measurement wavelength interval $T(\lambda)$: spectral transmittance at wavelength $\lambda$ $\lambda$: wavelengths between 290 nm and 400 nm The UPF rating value is a rating given in response to the UPF conversion value. The UPF rating value is expressed as "UPF50+" when the UPF conversion value is 55 or greater; the UPF rating value is expressed as "UPF50" when the UPF conversion value is 50 or greater and smaller than 55; and the UPF rating value is expressed as "UPF45" when the UPF conversion value is 45 or greater and smaller than 50. In this manner, the UPF rating value successively decreases by 5. The UPF rating value is expressed as "UPF15" when the UPF conversion value is 15 or greater and smaller than 20; and the UPF rating value is expressed as "UPF-inapplicable" when the UPF conversion value is 10 or smaller.

Specifically, the ultraviolet blocking rate is calculated using Expression (2) below.

$$\text{Ultraviolet blocking rate} = 100 \times [1 - \{\Sigma T(\lambda)\}/n] \qquad \text{Expression 2}$$

$T(\lambda)$: spectral transmittance at wavelength $\lambda$
$\lambda$: wavelengths between 290 nm and 400 nm
n: number of measurements within measurement wavelength range When being measured according to JIS L 1925: 2019, the ultraviolet protection factor (UPF) rating value of the ultraviolet blocking modacrylic fibers is UPF15 or more, preferably UPF20 or more, more preferably UPF25 or more, even more preferably UPF30 or more, and even more preferably UPF35 or more.

When being measured according to JIS L 1925: 2019, the ultraviolet blocking rate of the ultraviolet blocking modacrylic fibers is preferably 90% or more, more preferably 91% or more, and even more preferably 92% or more.

Although there is no particular limitation on a method for evaluating discoloration of the ultraviolet blocking modacrylic fibers, the discoloration of the ultraviolet blocking modacrylic fibers can be evaluated according to the degree of discoloration determined by visually comparing the color of a fabric containing the modacrylic fibers (e.g., a knitted fabric containing the modacrylic fibers in an amount of 100 wt %) irradiated for 40 hours in accordance with the xenon light resistance test JIS L 0843: 2006; 7.2c) (third light-exposure method) or ISO 105-B02: 1994; 7.2.3 (third method) with the initial color thereof. It is preferable that the ultraviolet blocking modacrylic fibers contain a flame retardant from the viewpoint of further improving the flame retardancy. Examples of the flame retardant include antimony compounds. The content of the antimony compound in the modacrylic fibers may be 1 wt % or more and 40 wt % or less, 2 wt % or more and 30 wt % or less, or 3 wt % or more and 20 wt % or less, with respect to the overall weight of the fibers. When the content of the antimony compound in the ultraviolet blocking modacrylic fibers is within the range above, the production stability in the spinning process is excellent, and favorable flame retardancy is achieved. The antimony compound may have a particle diameter of 0.01 μm or more and 5 μm or less.

Examples of the antimony compound include antimony trioxide, antimony tetroxide, antimony pentoxide, antimonic acid, antimonic acid salts such as sodium antimonite, and antimony oxychloride, and these compounds may be used alone or in combination of two or more. The antimony compound may include one or more compounds selected from the group consisting of antimony trioxide, antimony tetroxide, and antimony pentoxide from the viewpoint of the production stability in the spinning process.

The ultraviolet blocking modacrylic fibers may also contain various additives such as a flame retardant auxiliary, a matting agent, a crystal nucleating agent, a dispersant, a lubricant, a stabilizer, a fluorescent agent, an antioxidant, an antistatic agent, and a pigment as needed within a range that does not inhibit the effects of one or more embodiments of the present invention.

The single fiber fineness of the ultraviolet blocking modacrylic fibers is not particularly limited, but may be 1 dtex or more and 20 dtex or less or 1.5 dtex or more and 15 dtex or less from the viewpoint of the texture and the strength of a fabric made of the ultraviolet blocking modacrylic fibers. In one or more embodiments of the present invention, the single fiber fineness of the fibers can be measured according to JIS L 1015: 2020.

The fiber lengths of the ultraviolet blocking modacrylic fibers are not particularly limited, but may be 38 mm or longer and 127 mm or shorter or 38 mm or longer and 76 mm or shorter from the viewpoint of strength.

The strength of the ultraviolet blocking modacrylic fibers is not particularly limited, but may be 1.0 cN/dtex or more and 4.0 cN/dtex or less or 1.5 cN/dtex or more and 3.0 cN/dtex or less from the viewpoint of spinnability and processability. Also, the elongation of the modacrylic fibers is not particularly limited, but may be 20% or more and 35% or less or 20% or more and 25% or less from the viewpoint of spinnability and processability. In one or more embodiments of the present invention, the strength and the elongation of the fibers are measured according to JIS L 1015: 2020.

Method for Manufacturing Ultraviolet Blocking Modacrylic Fibers

In one or more embodiments of the present invention, the ultraviolet blocking modacrylic fibers may be manufactured through wet spinning of a spinning solution in the same manner as in manufacture of common modacrylic fibers, except that a modacrylic polymer produced through emulsion polymerization is used and a flame retardant, an ultraviolet reflector, an ultraviolet absorber, and other additives are added as needed to a spinning solution in which the modacrylic polymer is dissolved. For example, the ultraviolet blocking modacrylic fibers can be produced by extruding the spinning solution into a coagulation bath trough a nozzle to coagulate the extruded spinning solution, followed by washing the obtained coagulated filaments by water, drying, heat treatment, and, if needed, crimping and cutting. The coagulated filaments are drawn during or before the washing by water, or before or after the drying. An oil may be applied to the fibers before the crimping or before the drying as needed. Examples of the organic solvent include dimethylformamide, dimethylacetamide, acetone, and dimethylsulfoxide, but an inorganic solvent such as an aqueous solution of a rhodan salt or an aqueous solution of nitric acid may also be used. The above-mentioned other additives can also be applied to the manufactured modacrylic fibers in post-processing. There is no particular limitation on the application method, and examples thereof include a method in which the fibers are immersed in a dispersion liquid obtained by dispersing the additives in a solvent, and a method in which the dispersion liquid is sprayed onto the fibers.

A modacrylic polymer is commonly manufactured through suspension polymerization, but in one or more embodiments of the present invention, a modacrylic polymer containing an anionic surfactant can be obtained by producing a modacrylic polymer through emulsion polymerization using an anionic surfactant as an emulsifier, and the modacrylic polymer can be used to obtain modacrylic fibers containing an anionic surfactant.

The emulsion polymerization for producing the modacrylic polymer can be performed in the same manner as common emulsion polymerization, except that the above-described anionic surfactant is used as an emulsifier. For example, emulsion polymerization of one or two or more polymerizable monomers can be performed using a polymerization initiator in the presence of an emulsifier in an aqueous medium in a vessel such as a polymerization vessel. Each of the monomers (specifically, acrylonitrile, a halogen-containing monomer, and other components) may be added using any of a simultaneous addition method, a multiple-step addition method, and a continuous addition method, and these methods may also be used in combination as appropriate. Examples of the polymerization initiator include peroxodisulfates (also referred to as "persulfates"), organic peroxides, azo initiators, and a hydrogen peroxide solution.

In the case of using a monoalkyl sulfate salt and an alkyl benzenesulfonate salt together as the emulsifier, a content of the monoalkyl sulfate salt may be 0.010 wt % or more and less than 0.142 wt % and a content of the alkyl benzene-sulfonate salt may be 0.008 wt % or more and less than 0.140 wt %, or a content of the monoalkyl sulfate salt may be 0.011 wt % or more and less than 0.141 wt % and a content of the alkylbenzenesulfonate salt may be 0.009 wt % or more and less than 0.139 wt %, with respect to 100 parts by weight of the total amount of monomers constituting the modacrylic polymer, but there is no particular limitation to these contents. In the case of using sodium lauryl sulfate and sodium benzeneoxy bis-tetrapropylene sulfonate together as the anionic surfactant, a content of the sodium lauryl sulfate may be 0.010 wt % or more and less than 0.142 wt % and a content of the sodium benzeneoxy bis-tetrapropylene sulfonate may be 0.008 wt % or more and less than 0.140 wt %, or a content of the sodium lauryl sulfate may be 0.011 wt % or more and less than 0.141 wt % and a content of the sodium benzeneoxy bis-tetrapropylene sulfonate may be 0.009 wt % or more and less than 0.139 wt %, with respect to 100 parts by weight of the total amount of monomers constituting the modacrylic polymer, but there is no particular limitation to these contents.

Ultraviolet Blocking Fabric

In one or more embodiments of the present invention, an ultraviolet blocking fabric contains the above-mentioned ultraviolet blocking modacrylic fibers, and the content of the ultraviolet blocking modacrylic fibers may be 40 wt % or more or 50 wt % or more with respect to the overall weight of the fabric from the viewpoint of the ultraviolet blocking properties.

The ultraviolet blocking fabric may also contain cellulose fibers from the viewpoint of improving texture and touch. There is no particular limitation on the cellulose fibers, and it is preferable to use natural cellulose fibers from the viewpoint of durability. Examples of the natural cellulose fibers include cotton fibers, kapok fibers, linen fibers, ramie fibers, and jute fibers. Also, the natural cellulose fibers may also be flame-retardant cellulose fibers obtained by imparting flame retardancy to natural cellulose fibers such as cotton fibers, kapok fibers, linen fibers, ramie fibers, or jute fibers using a flame retardant such as a phosphorus compound (e.g., an N-methylol phosphonate compound, a tetrakishydroxyalkylphosphonium salt, or the like). These natural cellulose fibers may be used alone or in combination of two or more. The fiber lengths of the natural cellulose fibers may be 15 mm or longer and 38 mm or shorter or 20 mm or longer and 38 mm or shorter from the viewpoint of strength. The ultraviolet blocking fabric may also contain other fibers such as polyester fibers, nylon fibers, and aramid fibers within a range that does not inhibit the properties from the viewpoint of strength.

The ultraviolet blocking fabric may contain the ultraviolet blocking modacrylic fibers in an amount of 40 wt % or more and 100 wt % or less and the cellulose fibers in an amount of 0 wt % or more and 60 wt % or less, or the ultraviolet blocking modacrylic fibers in an amount of 50 wt % or more and 90 wt % or less and the cellulose fibers in an amount of 10 wt % or more and 50 wt % or less.

The ultraviolet blocking fabric may contain the ultraviolet blocking modacrylic fibers in an amount of 40 wt % or more and 100 wt % or less, the cellulose fibers in an amount of 0 wt % or more and 60 wt % or less, and other fibers in an amount of 0 wt % or more and 50 wt % or less, or the ultraviolet blocking modacrylic fibers in an amount of 50 wt % or more and 90 wt % or less, the cellulose fibers in an amount of 10 wt % or more and 50 wt % or less, and other fibers in an amount of 0 wt % or more and 50 wt % or less.

The content of the anionic surfactant in the ultraviolet blocking fabric may be 0.012 wt % or more or 0.030 wt % or more with respect to the overall weight of the fabric from the viewpoint of the ultraviolet blocking properties. From the viewpoint of further improving the ultraviolet blocking properties, more effectively suppressing discoloration, and further improving the feel of the fabric, the content of the anionic surfactant in the ultraviolet blocking fabric may be 0.030 wt % or more and less than 0.150 wt %, 0.040 wt % or more and 0.140 wt % or less, or 0.040 wt % or more and less than 0.130 wt %, with respect to the overall weight of the fabric. In the case of using a monoalkyl sulfate salt and an alkyl benzenesulfonate salt together as the anionic surfactant, the ultraviolet blocking fabric may contain the monoalkyl sulfate salt in an amount of 0.010 wt % or more and less than 0.142 wt %, and the alkyl benzenesulfonate salt in an amount of 0.008 wt % or more and less than 0.140 wt %, or the ultraviolet blocking fabric may contain the mono-alkyl sulfate salt in an amount of 0.011 wt % or more and less than 0.141 wt % and the alkyl benzenesulfonate salt in an amount of 0.009 wt % or more and less than 0.139 wt %. In the case of using sodium lauryl sulfate and sodium benzeneoxy bis-tetrapropylene sulfonate together as the anionic surfactant, the ultraviolet blocking fabric may contain the sodium lauryl sulfate in an amount of 0.010 wt % or more and less than 0.142 wt % and the sodium benzeneoxy bis-tetrapropylene sulfonate in an amount of 0.008 wt % or more and less than 0.140 wt %, or the ultraviolet blocking fabric may contain the sodium lauryl sulfate in an amount of 0.011 wt % or more and less than 0.141 wt % and the sodium benzeneoxy bis-tetrapropylene sulfonate in an amount of 0.009 wt % or more and less than 0.139 wt %.

The ultraviolet blocking fabric may contain an ultraviolet reflector and/or an ultraviolet absorber as needed, but when the content of the anionic surfactant is less than 0.15 wt %, it is preferable that the ultraviolet blocking fabric does not contain an ultraviolet reflector and/or an ultraviolet absorber. Meanwhile, when the content of the anionic surfactant is 0.15 wt % or more, it is preferable that the ultraviolet blocking fabric contains an ultraviolet reflector and/or an ultraviolet absorber in addition to the anionic surfactant from the viewpoint of further improving the ultraviolet blocking properties, more effectively suppressing discoloration of the fabric, and further improving the feel.

The content of the ultraviolet reflector in the ultraviolet blocking fabric may be 0.5 wt % or more, 1.0 wt % or more, or 1.5 wt % or more, from the viewpoint of the ultraviolet blocking properties. The content of the ultraviolet reflector may be 4 wt % or less, 3.5 wt % or less, or 3 wt % or less, from the viewpoint of the feel and the suppression of discoloration of the fabric.

The content of the ultraviolet absorber in the ultraviolet blocking fabric may be 0.05 wt % or more, 0.1 wt % or more, or 0.2 wt % or more, from the viewpoint of the ultraviolet blocking properties. The content of the ultraviolet absorber may be 2 wt % or less, 1.5 wt % or less, or 1 wt % or less, from the viewpoint of the feel and the suppression of discoloration of the fabric. Even in the case where the ultraviolet blocking fabric contains the ultraviolet reflector and/or the ultraviolet absorber, it is preferable that the ultraviolet blocking fabric contains the anionic surfactant in an amount of less than 0.15 wt %, and it is more preferable that the ultraviolet blocking fabric contains the anionic surfactant in an amount of 0.14 wt % or less, from the viewpoint of the feel and the suppression of discoloration of the ultraviolet blocking fabric.

The content of the anionic surfactant in the ultraviolet blocking fabric can be measured in conformity with JIS K 0400-30-10: 1999 "Determination of Anionic Surfactants by the Methylene Blue Spectrometric Method". A solution obtained by dissolving the fabric in an organic solvent can be used as a measurement sample. For example, a solution obtained by gradually adding dimethylformamide (DMF) heated to 50° C. to a predetermined amount of the fabric and dissolving the fabric in the minimum amount of DMF necessary to dissolve the fabric is used. In the case where two or more types of anionic surfactants are contained, both the total content of the anionic surfactants and the content of each anionic surfactant can be quantified in conformity with JIS K 0400-30-10: 1999 "Determination of Anionic Surfac-tants by the Methylene Blue Spectrometric Method".

Although there is no particular limitation on a method for evaluating the ultraviolet blocking properties of the ultra-violet blocking fabric, the ultraviolet blocking properties can be evaluated by measuring the ultraviolet protection factor (UPF) conversion value, the UPF rating value, and the ultraviolet blocking rate described in JIS L 1925: 2019 and using them, as in the case of the ultraviolet blocking modacrylic fibers.

Although there is no particular limitation on a method for evaluating discoloration of the ultraviolet blocking fabric, the discoloration of the ultraviolet blocking fabric can be evaluated based on the degree of discoloration determined by visually comparing the color of the fabric containing ultraviolet blocking modacrylic fibers irradiated for 40 hours in accordance with the xenon light resistance test JIS L 0843: 2006; 7.2c) (third light-exposure method) or ISO 105-B02: 1994; 7.2.3 (third method) with the initial color thereof as in the case of the ultraviolet blocking modacrylic fibers.

When being measured according to JIS L 1925: 2019, the ultraviolet protection factor (UPF) rating value of the ultra-violet blocking fabric is UPF15 or more, preferably UPF20 or more, more preferably UPF25 or more, even more preferably UPF30 or more, and even more preferably UPF35 or more.

When being measured according to JIS L 1925: 2019, the ultraviolet blocking rate of the ultraviolet blocking fabric is preferably 90% or more, more preferably 91% or more, and even more preferably 92% or more.

The ultraviolet blocking fabric may be a woven fabric or a knitted fabric.

Examples of the woven fabric include a plain weave fabric, a twill weave fabric, a satin weave fabric, a plain derivative weave fabric, a twill derivative weave fabric, a satin derivative weave fabric, a derivative weave fabric, a brocade fabric, a half double weave fabric, a double struc-ture fabric, a multiple structure fabric, a warp pile weave fabric, a weft pile weave fabric, and a leno weave fabric. Commercial products made of a plain weave fabric, a satin weave fabric, and a brocade fabric are excellent in texture, strength, and the like.

Examples of the knitted fabric include a circular knit fabric, a weft knit fabric, a warp knit fabric, and a pile knit fabric. In addition, examples thereof include a plain knit fabric, a jersey knit fabric, a rib knit fabric, a smooth knit (interlock knit) fabric, a rubber knit fabric, a pearl knit fabric, a denbigh structure fabric, a cord structure fabric, an atlas structure fabric, a chain structure fabric, and an inlay structure fabric. Commercial products made of a jersey knit fabric and a rib knit fabric are excellent in texture.

Fiber Products

In one or more embodiments of the present invention, fiber products contain the above-mentioned ultraviolet blocking fabric, and are not particularly limited. However, from the viewpoint of the ultraviolet blocking properties, examples of the fiber products include curtains, curtain linings, wallpaper, towels, work clothing, firefighting cloth-ing, ceiling materials, canopies, parasols, hats, flame-resis-tant stuffing, heat insulating materials, filters, fibrous wad-ding, fibrous packaging materials, lining materials, tents, and tarps. The fiber products may also contain other fabrics and fibers.

EXAMPLES

Hereinafter, one or more embodiments of the present invention will be described in detail by way of examples. However, one or more embodiments of the present invention are not limited to the examples.

The measurement and evaluation methods used in examples and comparative examples are as follows.

Method for Quantifying Anionic Surfactant

The anionic surfactant was quantified in conformity with JIS K 0400-30-10: 1999 "Determination of Anionic Surfac-tants by the Methylene Blue Spectrometric Method". A solution obtained by gradually adding dimethylformamide (DMF) heated to 50° C. to a predetermined amount of the modacrylic fibers and dissolving the modacrylic fibers in the minimum amount of DMF necessary to dissolve the modacrylic fibers was used as a measurement sample. Iden-tification of the type of anionic surfactant and quantification of each anionic surfactant were performed in accordance with "Determination of Anionic Surfactants by the Methyl-ene Blue Spectrometric Method".

Method for Quantifying Ultraviolet Reflector

Titanium dioxide serving as an ultraviolet reflector was quantified using an aluminum reduction titration method. Specifically, first, the modacrylic fibers were precisely weighed and were then completely dissolved in concentrated sulfuric acid, and ammonium sulfate was added to the resultant solution and was dissolved by heating. After hydro-chloric acid and aluminum were added to the cooled solu-tion, the resultant mixture was sufficiently stirred, and then potassium thiocyanate serving as an indicator was added thereto. Immediately, titration was performed using an ammonium iron (II) sulfate solution, and a point where light brown color remains for about 30 seconds was taken as an end point.

Method for Evaluating Ultraviolet Blocking Properties

The ultraviolet protection factor (UPF) conversion value was measured according to JIS L 1925: 2019, and the UPF rating value was determined. The UPF conversion value was calculated using Expression (1) below. Also, the ultraviolet blocking rate was measured according to JIS L 1925: 2019 and was calculated using Expression (2) below. A jersey knit fabric containing the modacrylic fibers in an amount of 100 wt % was used as a measurement sample, and the measurement conditions were as follows.

Measurement environment: 20±15° C.×65±20% RH

Spectrophotometer: photometer with light source for continuous light in wavelength range from 290 to 400 nm $$\text{UPF conversion value} = \Sigma E(\lambda) \cdot S(\lambda) \cdot \Delta(\lambda) / \Sigma E(\lambda) \cdot S(\lambda) \cdot T(\lambda) \cdot \Delta(\lambda) \qquad \text{Expression 1}$$

UPF conversion value: ultraviolet protection factor conversion value $S(\lambda)$: relative energy value of solar spectral irradiance at wavelength $\lambda$ $E(\lambda)$: value expressing degree of influence on skin at each wavelength $\Delta(\lambda)$: measurement wavelength interval $T(\lambda)$: spectral transmittance at wavelength $\lambda$ $\lambda$: wavelengths between 290 nm and 400 nm $$\text{Ultraviolet blocking rate} = 100 \times [1 - \{\Sigma T(\lambda)\}/n] \qquad \text{Expression 2}$$

$T(\lambda)$: spectral transmittance at wavelength $\lambda$ $\lambda$: wavelengths between 290 nm and 400 nm n: number of measurements within measurement wavelength range Xenon Light Resistance Test The degree of discoloration was determined by visually comparing the color after irradiation for 40 hours in accordance with the xenon light resistance test JIS L 0843: 2006; 7.2c) (third light-exposure method) or ISO 105-B02:1994; 7.2.3 (third method) with the initial color. When discoloration was not observed, the xenon light resistance was determined as "Good", and when discoloration was observed, the xenon light resistance was determined as "Poor". A jersey knit fabric containing the modacrylic fibers in an amount of 100 wt % was used as a measurement sample.

Evaluation of Feel

Ten persons touched each sample by hands and evaluated the feel. When each person determined that the feel was good, one point was given, and when each person determined that the feel was poor, no point was given. When the total score from the ten persons was eight points or more, the feel was determined as "Good", when the total score was four to seven points, the feel was determined as "Average", and when the total score was three points or less, the feel was determined as "Poor". A jersey knit fabric containing the modacrylic fibers in an amount of 100 wt % was used as a measurement sample.

Example 1

Production of Modacrylic Fibers I

A modacrylic polymer containing acrylonitrile in an amount of 51 wt %, vinyl chloride in an amount of 48 wt %, and sodium p-styrenesulfonate in an amount of 1 wt % was produced through emulsion polymerization using sodium lauryl sulfate and sodium benzeneoxy bis-tetrapropylene sulfonate as an emulsifier, and the obtained modacrylic polymer was dissolved in dimethylformamide such that the polymer concentration was 30 wt %. A spinning solution was produced by adding, to the obtained polymer solution, 10 parts by weight of antimony trioxide (Sb₂O₃, manufactured by Nihon Seiko Co., Ltd., product name "Patx-M") with respect to 100 parts by weight of the polymer weight. A dispersion liquid was prepared in advance by adding antimony trioxide to dimethylformamide at a concentration of 30 wt % and uniformly dispersing antimony trioxide, and this dispersion liquid was used as antimony trioxide. In the antimony trioxide dispersion liquid, the particle diameter of the antimony trioxide measured through laser diffractometry was 2 μm or less. The obtained spinning solution was extruded into a 50 wt % aqueous solution of dimethylformamide through a 300-hole nozzle with a nozzle hole diameter of 0.08 mm and was coagulated, followed by washing the obtained coagulated filaments by water and drying at 120° C. The dried filaments were drawn until the lengths were tripled, followed by heat treatment at 145° C. for 5 minutes. Thus modacrylic fibers I were obtained. The obtained modacrylic fibers I had a single fiber fineness of 1.7 dtex and a cut length of 51 mm.

Production of Fabric

Spun yarns with cotton count No. shown in Table 1 below were manufactured using the modacrylic fibers I in an amount of 100 wt %. A jersey knit fabric having a basis weight shown in Table 1 below was produced using a common manufacturing method using these spun yarns.

Example 2

Production of Modacrylic Fibers II

First, a modacrylic polymer containing acrylonitrile in an amount of 51 wt %, vinylidene chloride in an amount of 48 wt %, and sodium p-styrenesulfonate in an amount of 1 wt % was produced in the same manner as in Example 1, except that vinyl chloride was changed to vinylidene chloride, and the amounts of sodium lauryl sulfate and sodium benzeneoxy bis-tetrapropylene sulfonate added in emulsion polymerization were changed. Then, modacrylic fibers II were obtained in the same manner as the modacrylic fibers I, except that the thus obtained modacrylic polymer was used. The obtained modacrylic fibers II had a single fiber fineness of 1.7 dtex and a cut length of 51 mm.

Production of Fabric

Spun yarns with cotton count No. shown in Table 1 below were manufactured using the modacrylic fibers II in an amount of 100 wt %. A jersey knit fabric having a basis weight shown in Table 1 below was produced using a common manufacturing method using these spun yarns.

Example 3

Production of Modacrylic Fibers III

First, a modacrylic polymer containing acrylonitrile in an amount of 51 wt %, vinylidene chloride in an amount of 48 wt %, and sodium p-styrenesulfonate in an amount of 1 wt % was produced in the same manner as in Example 2, except that the amounts of sodium lauryl sulfate and sodium benzeneoxy bis-tetrapropylene sulfonate added in emulsion polymerization were changed. Then, the thus obtained modacrylic polymer was dissolved in dimethylformamide such that the polymer concentration was 30 wt %. Modacrylic fibers III were obtained in the same manner as in Example 2, except that a spinning solution was produced by adding, to the obtained polymer solution, 10 parts by weight of antimony pentoxide (Sb₂O₅, manufactured by Nyacol Nano Technologies, product name "A1550N+T25") and 1 part by weight of titanium oxide (manufactured by Sakai Chemical Industry Co., Ltd., product name "R-22L") with respect to 100 parts by weight of the polymer weight. The obtained modacrylic fibers III had a single fiber fineness of 1.7 dtex and a cut length of 51 mm.

Production of Fabric

Spun yarns with cotton count No. shown in Table 1 below were manufactured using the modacrylic fibers III in an amount of 100 wt %. A jersey knit fabric having a basis weight shown in Table 1 below was produced using a common manufacturing method using these spun yarns.

Example 4

Production of Modacrylic Fibers IV

First, a modacrylic polymer containing acrylonitrile in an amount of 51 wt %, vinylidene chloride in an amount of 48 wt %, and sodium p-styrenesulfonate in an amount of 1 wt % was produced in the same manner as in Example 2, except that the amounts of sodium lauryl sulfate and sodium benzeneoxy bis-tetrapropylene sulfonate added in emulsion polymerization were changed. Then, the thus obtained modacrylic polymer was dissolved in dimethylformamide such that the polymer concentration was 30 wt %. A spinning solution was produced by adding, to the obtained polymer solution, 10 parts by weight of antimony trioxide ($Sb_2O_3$, manufactured by Nihon Seiko Co., Ltd., product name "Patx-M") and 2 parts by weight of titanium oxide (manufactured by Sakai Chemical Industry Co., Ltd., product name "R-22L") with respect to 100 parts by weight of the polymer weight. A dispersion liquid was prepared in advance by adding antimony trioxide to dimethylformamide at a concentration of 30 wt % and uniformly dispersing antimony trioxide, and this dispersion liquid was used as antimony trioxide. In the antimony trioxide dispersion liquid, the particle diameter of the antimony trioxide measured through laser diffractometry was 2 µm or less. Modacrylic fibers IV were obtained in the same manner as in Example 2, except that the obtained spinning solution was used. The modacrylic fibers IV had a single fiber fineness of 1.7 dtex and a cut length of 51 mm.

Production of Fabric

Spun yarns with cotton count No. shown in Table 1 below were manufactured using the modacrylic fibers IV in an amount of 100 wt %. A jersey knit fabric having a basis weight shown in Table 1 below was produced using a common manufacturing method using these spun yarns.

Comparative Example 1

Armora AT414 manufactured by Aksa was used as modacrylic fibers V. The modacrylic fibers V had a single fiber fineness of 1.6 dtex and a cut length of 51 mm.

Spun yarns with cotton count No. shown in Table 1 below were manufactured using the modacrylic fibers V in an amount of 100 wt %. A jersey knit fabric having a basis weight shown in Table 1 below was produced using a common manufacturing method using these spun yarns.

Comparative Example 2

A highly flame-retardant modacrylic fiber manufactured by Fushun Rayva Fiber was used as modacrylic fibers VI. The modacrylic fibers VI had a fineness of 1.7 dtex and a cut length of 51 mm.

Spun yarns with cotton count No. shown in Table 1 below were manufactured using the modacrylic fibers VI in an amount of 100 wt %. A jersey knit fabric having a basis weight shown in Table 1 below was produced using a common manufacturing method using these spun yarns.

Comparative Example 3

Production of Modacrylic Fibers VII

Modacrylic fibers VII were obtained in the same manner as the modacrylic fibers IV except that antimony trioxide and titanium oxide were not used. The modacrylic fibers VII had a single fiber fineness of 1.7 dtex and a cut length of 51 mm.

Production of Fabric

Spun yarns with cotton count No. shown in Table 1 below were manufactured using the modacrylic fibers VII in an amount of 100 wt %. A jersey knit fabric having a basis weight shown in Table 1 below was produced using a common manufacturing method using these spun yarns.

Comparative Example 4

Production of Modacrylic Fibers VIII

Modacrylic fibers VIII were obtained in the same manner as the modacrylic fibers IV except that titanium oxide was not used. The modacrylic fibers VIII had a single fiber fineness of 1.7 dtex and a cut length of 51 mm.

Production of Fabric

Spun yarns with cotton count No. shown in Table 1 below were manufactured using the modacrylic fibers VIII in an amount of 100 wt %. A jersey knit fabric having a basis weight shown in Table 1 below was produced using a common manufacturing method using these spun yarns.

Reference Example 1

Production of Modacrylic Fibers IX

Modacrylic fibers IX were produced by attaching 5 parts by weight of titanium oxide to 100 parts by weight of the modacrylic fibers VI. The modacrylic fibers IX had a single fiber fineness of 1.7 dtex and a cut length of 51 mm.

Production of Fabric

Spun yarns with cotton count No. shown in Table 1 below were manufactured using the modacrylic fibers IX in an amount of 100 wt %. A jersey knit fabric having a basis weight shown in Table 1 below was produced using a common manufacturing method using these spun yarns.

In the examples, the comparative examples, and the reference example, the content of the anionic surfactant in the modacrylic fibers, the ultraviolet blocking properties, the discoloration, and the feel were measured and evaluated as described above. Table 1 below shows the results. The content of the anionic surfactant in Table 1 below refers to the content of the anionic surfactant in the modacrylic fibers. Note that, since the fabric contained the modacrylic fibers in an amount of 100 wt %, the content of the anionic surfactant in the fabric was the same as the content of the anionic surfactant in the modacrylic fibers. In the examples and the comparative examples, the blend amounts of the ultraviolet reflector and the flame retardant were those with respect to 100 parts by weight of the modacrylic polymer. In Reference Example 1, the blend amount of the ultraviolet reflector was that with respect to 100 parts by weight of the modacrylic fibers.

TABLE 1

| | | Example | | | | Comparative Example | | | | Reference Example |
|---|---|---|---|---|---|---|---|---|---|---|
| | | 1 | 2 | 3 | 4 | 1 | 2 | 3 | 4 | 1 |
| Blend amount (wt %) | Modacrylic fibers I | 100 | 0 | 0 | 0 | 0 | 0 | 0 | 0 | 0 |
| | Modacrylic fibers II | 0 | 100 | 0 | 0 | 0 | 0 | 0 | 0 | 0 |
| | Modacrylic fibers III | 0 | 0 | 100 | 0 | 0 | 0 | 0 | 0 | 0 |
| | Modacrylic fibers IV | 0 | 0 | 0 | 100 | 0 | 0 | 0 | 0 | 0 |
| | Modacrylic fibers V | 0 | 0 | 0 | 0 | 100 | 0 | 0 | 0 | 0 |
| | Modacrylic fibers VI | 0 | 0 | 0 | 0 | 0 | 100 | 0 | 0 | 0 |
| | Modacrylic fibers VII | 0 | 0 | 0 | 0 | 0 | 0 | 100 | 0 | 0 |
| | Modacrylic fibers VIII | 0 | 0 | 0 | 0 | 0 | 0 | 0 | 100 | 0 |
| | Modacrylic fibers IX | 0 | 0 | 0 | 0 | 0 | 0 | 0 | 0 | 100 |
| Ultraviolet reflector I (parts by weight) | Titanium oxide | 0 | 0 | 1 | 2 | 0 | 0 | 0 | 0 | 5 |
| Flame retardant (parts by weight) | Antimony trioxide | 10 | 10 | 0 | 10 | 10 | 10 | 0 | 10 | 10 |
| | Antimony pentoxide | 0 | 0 | 10 | 0 | 0 | 0 | 0 | 0 | 0 |
| Anionic surfactant (wt %) | Sodium laurylsulfate | 0.090 | 0.029 | 0.011 | 0.152 | 0 | 0 | 0.152 | 0.152 | 0 |
| | Sodium benzeneoxy bis-tetrapropylene sulfonate | 0.047 | 0.009 | 0.058 | 0.079 | 0 | 0 | 0.079 | 0.079 | 0 |
| | Total | 0.137 | 0.038 | 0.069 | 0.231 | 0 | 0 | 0.231 | 0.231 | 0 |
| Spun yarns | Cotton count No. | 18/1 | 18/1 | 18/1 | 18/1 | 18/1 | 18/1 | 18/1 | 18/1 | 18/1 |
| Fabric | Basis weight (g/m$^2$) | 195 | 184 | 187 | 206 | 200 | 206 | 210 | 210 | 206 |
| | Structure | Jersey knit | Jersey knit | Jersey knit | Jersey knit | Jersey knit | Jersey knit | Jersey knit | Jersey knit | Jersey knit |
| Ultraviolet properties blocking | UPF rating value | UPF35 | UPF15 | UPF25 | UPF15 | Inapplicable | Inapplicable | Inapplicable | Inapplicable | UPF25 |
| | Ultraviolet blocking rate (%) | 95.5 | 92.2 | 94.2 | 92.3 | 84.6 | 84.8 | 87.7 | 87.7 | 94.3 |
| Discoloration | Xenon light resistance | Good | Good | Good | Good | Good | Good | Poor | Good | Poor |
| | Feel | Good | Good | Good | Good | Good | Good | Poor | Good | Poor |

As is clear from the results shown in Table 1, the modacrylic fibers of Examples 1 to 3 containing the anionic surfactant in a predetermined amount and the fabrics containing these modacrylic fibers all had a high UPF rating value, a high ultraviolet blocking rate, favorable xenon light resistance, and favorable feel. In the case of the modacrylic fibers containing the anionic surfactant in a large amount as in Example 4, using a small amount of the ultraviolet reflector together made it possible to achieve a high UPF rating value, a high ultraviolet blocking rate, favorable xenon light resistance, and favorable feel.

Meanwhile, the modacrylic fibers of Comparative Examples 1 and 2 containing no anionic surfactant and the fabrics containing these modacrylic fibers had no applicable UPF rating value and poor ultraviolet blocking properties.

Comparative Examples 3 and 4 containing the anionic surfactant in a large amount but no ultraviolet reflector had poor ultraviolet blocking properties. Also, Comparative Example 3 had poor xenon light resistance and poor feel.

Reference Example 1 in which only a large amount of the ultraviolet absorber was used had excellent ultraviolet blocking properties but poor xenon light resistance and poor feel.

One or more embodiments of the present invention are not particularly limited, but may encompass at least the following one or more embodiments.

[1] Ultraviolet blocking modacrylic fibers comprising an anionic surfactant in an amount of 0.03 wt % or more, wherein an ultraviolet protection factor (UPF) rating value of the ultraviolet blocking modacrylic fibers measured according to JIS L 1925: 2019 is UPF15 or more.

[2] The ultraviolet blocking modacrylic fibers according to [1], wherein the ultraviolet blocking modacrylic fibers contain the anionic surfactant in an amount of 0.03 wt % or more and less than 0.15 wt %.

[3] The ultraviolet blocking modacrylic fibers according to [1], wherein the ultraviolet blocking modacrylic fibers contain the anionic surfactant in an amount of 0.15 wt % or more, and an ultraviolet reflector in an amount of 0.5 wt % or more and 4 wt % or less and/or an ultraviolet absorber in an amount of 0.05 wt % or more and 2 wt % or less.

[4] The ultraviolet blocking modacrylic fibers according to any one of [1] to [3], wherein the anionic surfactant is one or more selected from the group consisting of a monoalkyl sulfate salt, an alkyl polyoxyethylene sulfate salt, an alkyl benzenesulfonate salt, and an alkyl polyphenylene ether sulfonate salt.

[5] The ultraviolet blocking modacrylic fibers according to any one of [1] to [4], wherein the anionic surfactant includes a monoalkyl sulfate salt and an alkyl benzenesulfonate salt.

[6] The ultraviolet blocking modacrylic fibers according to any one of [1] to [5], wherein an ultraviolet blocking rate of the ultraviolet blocking modacrylic fibers measured according to JIS L 1925: 2019 is 90% or more.

[7] The ultraviolet blocking modacrylic fibers according to any one of [1] to [6], wherein the ultraviolet blocking modacrylic fibers contain an antimony compound in an amount of 1 wt % or more and 40 wt % or less.

[8] The ultraviolet blocking modacrylic fibers according to any one of [1] to [7], wherein the ultraviolet blocking modacrylic fibers comprising a modacrylic polymer that contains acrylonitrile in an amount of 35 wt % or more and 85 wt % or less, one or more halogen-containing monomers selected from the group consisting of a halogen-containing vinyl monomer and a halogen-containing vinylidene monomer in an amount of 15 wt % or more and 65 wt % or less, and a sulfonic acid group-containing vinyl monomer in an amount of 0 wt % or more and 3 wt % or less.

[9] The ultraviolet blocking modacrylic fibers according to [2], wherein the ultraviolet blocking modacrylic fibers contain a monoalkyl sulfate salt and an alkyl-benzenesulfonate salt as the anionic surfactant, and wherein a content of the monoalkyl sulfate salt is 0.010 wt % or more and less than 0.142 wt %, and a content of the alkyl benzenesulfonate salt is 0.008 wt % or more and less than 0.140 wt %.

[10] The ultraviolet blocking modacrylic fibers according to [2], wherein the ultraviolet blocking modacrylic fibers contain sodium lauryl sulfate and sodium benzeneoxy bis-tetrapropylene sulfonate as the anionic surfactant, and wherein a content of the sodium lauryl sulfate is 0.010 wt % or more and less than 0.142 wt %, and a content of the sodium benzeneoxy bis-tetrapropylene sulfonate is 0.008 wt % or more and less than 0.140 wt %.

[11] The ultraviolet blocking modacrylic fibers according to [3], wherein the ultraviolet blocking modacrylic fibers contain a monoalkyl sulfate salt and an alkyl-benzenesulfonate salt as the anionic surfactant, and wherein a content of the monoalkyl sulfate salt is 0.010 wt % or more and less than 0.142 wt %, and a content of the alkyl benzenesulfonate salt is 0.008 wt % or more and less than 0.140 wt %.

[12] The ultraviolet blocking modacrylic fibers according to [3], wherein the ultraviolet blocking modacrylic fibers contain sodium lauryl sulfate and sodium benzeneoxy bis-tetrapropylene sulfonate as the anionic surfactant, and a content of the sodium lauryl sulfate is 0.010 wt % or more and less than 0.142 wt %, and a content of the sodium benzeneoxy bis-tetrapropylene sulfonate is 0.009 wt % or more and 0.139 wt % or less.

[13] An ultraviolet blocking fabric comprising the ultraviolet blocking modacrylic fibers according to any one of [1] to [12] in an amount of 40 wt % or more.

[14] A fiber product comprising the ultraviolet blocking fabric according to [13].

[15] A method for manufacturing the ultraviolet blocking modacrylic fibers according to any one of [1] to [12], comprising a step of forming a modacrylic polymer through emulsion polymerization, wherein an emulsifier used in the emulsion polymerization includes an anionic surfactant.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. Ultraviolet blocking modacrylic fibers comprising an anionic surfactant in an amount of 0.03 wt % or more and less than 0.15 wt %, wherein an ultraviolet protection factor UPF rating value of the ultraviolet blocking modacrylic fibers measured according to JIS L 1925:2019 is UPF15 or more, the anionic surfactant is a monoalkyl sulfate salt and an alkyl benzenesulfonate salt, a content of the monoalkyl sulfate salt is 0.010 wt % or more and less than 0.142 wt %, and a content of the alkyl benzenesulfonate salt is 0.008 wt % or more and less than 0.140 wt %.

2. The ultraviolet blocking modacrylic fibers according to claim 1, wherein the anionic surfactant is one or more selected from the group consisting of a monoalkyl sulfate salt, an alkyl polyoxyethylene sulfate salt, an alkyl benzenesulfonate salt, and an alkyl polyphenylene ether sulfonate salt.

3. The ultraviolet blocking modacrylic fibers according to claim 1, wherein the anionic surfactant includes a monoalkyl sulfate salt and an alkyl benzenesulfonate salt.

4. The ultraviolet blocking modacrylic fibers according to claim 1, wherein an ultraviolet blocking rate of the ultraviolet blocking modacrylic fibers measured according to JIS L 1925:

2019 is 90% or more.

5. The ultraviolet blocking modacrylic fibers according to claim 1, comprising an antimony compound in an amount of 1 wt % or more and 40 wt % or less.

6. The ultraviolet blocking modacrylic fibers according to claim 1, comprising a modacrylic polymer including:

acrylonitrile in an amount of 35 wt % or more and 85 wt % or less;

one or more halogen-containing monomers selected from the group consisting of a halogen- containing vinyl monomer and a halogen-containing vinylidene monomer in an amount of 15 wt % or more and 65 wt % or less; and a sulfonic acid group-containing vinyl monomer in an amount of 0 wt % or more and 3 wt % or less.

7. An ultraviolet blocking fabric comprising the ultraviolet blocking modacrylic fibers according to claim 1 in an amount of 40 wt % or more.

8. A fiber product comprising the ultraviolet blocking fabric according to claim 7.

9. A method for manufacturing the ultraviolet blocking modacrylic fibers according to claim 1, comprising a step of forming a modacrylic polymer by an emulsion polymerization method, wherein an emulsifier used in the emulsion polymerization method includes the anionic surfactant.

10. The ultraviolet blocking fabric according to claim 7, comprising the anionic surfactant in an amount of 0.03 wt % or more and less than 0.15 wt %.

11. The ultraviolet blocking fabric according to claim 7, comprising the anionic surfactant in an amount of 0.15 wt % or more, and an ultraviolet reflector in an amount of 0.5 wt % or more and 4 wt % or less and/or an ultraviolet absorber in an amount of 0.05 wt % or more and 2 wt % or less.

12. The fiber product according to claim 8, wherein the ultraviolet blocking modacrylic fibers comprise the anionic surfactant in an amount of 0.03 wt % or more and less than 0.15 wt %.

13. The fiber product according to claim 8, wherein the ultraviolet blocking modacrylic fibers comprise the anionic surfactant in an amount of 0.15 wt % or more, and an ultraviolet reflector in an amount of 0.5 wt % or more and 4 wt % or less and/or an ultraviolet absorber in an amount of 0.05 wt % or more and 2 wt % or less.

14. The ultraviolet blocking modacrylic fibers according to claim 1, wherein the monoalkyl sulfate salt is sodium lauryl sulfate and the alkyl benzenesulfonate salt is sodium benzeneoxy bis- tetrapropylene sulfonate.

15. Ultraviolet blocking modacrylic fibers comprising:
an anionic surfactant in an amount of 0.15 wt % or more; and
an ultraviolet reflector in an amount of 0.5 wt % or more and 4 wt % or less and/or an ultraviolet absorber in an amount of 0.05 wt % or more and 2 wt % or less,
wherein an ultraviolet protection factor UPF rating value of the ultraviolet blocking modacrylic fibers measured according to JIS L 1925:2019 is UPF15 or more,
the anionic surfactant is a monoalkyl sulfate salt and an alkyl benzenesulfonate salt,
a content of the monoalkyl sulfate salt is 0.010 wt % or more and less than 0.142 wt %, and
a content of the alkyl benzenesulfonate salt is 0.008 wt % or more and less than 0.140 wt %.

16. The ultraviolet blocking modacrylic fibers according to claim 15, wherein
the monoalkyl sulfate salt is sodium lauryl sulfate and the alkyl benzenesulfonate salt is sodium benzeneoxy bis-tetrapropylene sulfonate,
a content of the sodium lauryl sulfate is 0.011 wt % or more and less than 0.141 wt %, and
a content of the sodium benzeneoxy bis-tetrapropylene sulfonate is 0.009 wt % or more and less than 0.139 wt %.

* * * * *